United States Patent
Boehme et al.

(10) Patent No.: US 11,697,488 B2
(45) Date of Patent: *Jul. 11, 2023

(54) RADOME COVER SHELL AND OPENING KINEMATIC

(71) Applicant: AIRBUS HELICOPTERS DEUTSCHLAND GMBH, Donauworth (DE)

(72) Inventors: Jan Boehme, Harburg (DE); Yann Le Cadet, Westendorf (DE); Martin Lazak, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 259 days.

This patent is subject to a terminal disclaimer.

(21) Appl. No.: 17/110,602

(22) Filed: Dec. 3, 2020

(65) Prior Publication Data
US 2022/0126977 A1    Apr. 28, 2022

Related U.S. Application Data

(63) Continuation of application No. 17/077,573, filed on Oct. 22, 2020.

(51) Int. Cl.
*B64C 1/36* (2006.01)
*H01Q 1/42* (2006.01)
*H01Q 1/28* (2006.01)

(52) U.S. Cl.
CPC ............. *B64C 1/36* (2013.01); *H01Q 1/42* (2013.01); *H01Q 1/281* (2013.01)

(58) Field of Classification Search
CPC ............. B64C 1/36; B64C 1/14; B64C 1/476
See application file for complete search history.

(56) References Cited

U.S. PATENT DOCUMENTS

| | | |
|---|---|---|
| 2,943,756 A | 7/1960 | White |
| 3,374,972 A | 3/1968 | Webb, Sr. |

(Continued)

FOREIGN PATENT DOCUMENTS

| | | |
|---|---|---|
| CN | 207565827 U | 7/2018 |
| DE | 1481684 A1 | 3/1969 |
| FR | 2379434 A1 | 9/1978 |

OTHER PUBLICATIONS

European Search Report for European Application No. EP 19400020.4, Completed by the European Patent Office, dated Mar. 11, 2020, 7 pages.

(Continued)

*Primary Examiner* — Brady W Frazier
*Assistant Examiner* — Shanna Danielle Glover
(74) *Attorney, Agent, or Firm* — Brooks Kushman P.C.

(57) ABSTRACT

An aircraft with an aircraft structure that comprises a radome cover opening kinematic and a radome cover shell that is adapted to enclose equipment in a nose region of the aircraft in a closed position. The radome cover opening kinematic may enable movements of the radome cover shell between the closed position and an opened position and vice versa. The radome cover opening kinematic may include a guiding rail that is attached to the radome cover shell, and at least three rollers that are attached to the aircraft structure, wherein a first and a second roller are arranged on opposing sides of the guiding rail, and wherein the second and a third roller are arranged on the same side of the guiding rail. The radome shell opening kinematic further comprises a radome cover shell rotation stopper that can stop movement of the radome cover shell at the completely opened position.

19 Claims, 8 Drawing Sheets

(56) References Cited

U.S. PATENT DOCUMENTS

| | | | |
|---|---|---|---|
| 4,174,609 | A | 11/1979 | Legrand et al. |
| 4,188,631 | A | 2/1980 | Dougherty et al. |
| 5,820,077 | A | 10/1998 | Sutliff et al. |
| 6,796,529 | B1 | 9/2004 | Duran et al. |
| 9,608,320 | B2 | 3/2017 | Fournie et al. |
| 2016/0190679 | A1* | 6/2016 | Fournie ............... H01Q 1/281 |
| | | | 343/872 |
| 2017/0062920 | A1 | 3/2017 | Harleman |
| 2018/0134366 | A1 | 5/2018 | Merkel et al. |
| 2022/0126976 | A1 | 4/2022 | Boehme et al. |

OTHER PUBLICATIONS

U S. Non-Final Office Action dated Oct. 12, 2022, U.S. Appl. No. 17/077,572, 18 Pages.

* cited by examiner

RADOME COVER SHELL AND OPENING KINEMATIC

CROSS-REFERENCE TO RELATED APPLICATIONS

This application is a continuation of U.S. application Ser. No. 17/077,573 filed Oct. 22, 2020, the disclosure of which is hereby incorporated in its entirety by reference herein.

BACKGROUND OF THE INVENTION

(1) Field of the Invention

The present embodiments relate to an aircraft with an aircraft structure, and, more particularly, to an aircraft with an aircraft structure that comprises a radome cover shell and opening kinematic.

(2) Description of Related Art

A radome is usually located at the nose region of an aircraft and includes equipment that is located in that particular region of the aircraft and a radome cover. The radome cover is a compound curved shell structure used to enclose or protect the equipment housed in the nose region of the aircraft. Radome covers can be formed in a variety of shapes, depending upon the type of aircraft with which the radome cover is being used. One common shape is the approximately conical shape seen on numerous jet aircraft or helicopters. The conical shape is occasionally supplemented with a pointed or needle-like projection extending beyond the conical shape.

A radome cover usually includes a radome cover shell and a radome cover opening kinematics. The radome cover shell is conventionally attached to the aircraft structure by means of the radome cover opening kinematics, and the radome cover opening kinematics should provide easy access to the enclosed equipment. The radome cover opening kinematics often include fixed hinges that attach the radome cover shell to the aircraft structure. However, conventional hinge mechanisms with a simple rotation around a fixed axis would interfere with the enclosed equipment during the rotational movement.

Therefore, most radome cover opening kinematics slide the radome cover shell forward before rotating it around a fixed axis. As an example, the H155 helicopter of Airbus Helicopters has an opening mechanism that involves a sliding mechanism with a rod that can be moved along the rod axis within a guiding tube and a hinge that is attached to the radome cover shell and the middle of the rod. During the opening operation, the rod has to be pulled out of the guiding tube with a sliding movement until the hinge is free to rotate. The following rotation then swivels the radome cover shell upwards. During the closing operation, the radome cover shell is rotated downwards before the rod can be pushed back into the guiding tube with a sliding movement.

However, sliding mechanisms are usually sensitive to dirt and have to be adjusted precisely during installation to avoid twisting and blocking of the rod inside the guiding tube. Furthermore, the above described sliding mechanism introduces high bending moments and loads into the guiding tube when the rod is pulled out of the guiding tube. Thus, a lightweight design of the sliding mechanism with the rod and the guiding tube is difficult to achieve and requires a lot of space.

The document CN 207565827U describes a radome coupling mechanism. It includes a radome cover, a hinge, a hook lock, and a vaulting pole. The radome cover is arranged at the front of the fuselage. It provides an opening part that can seal the opening. The radome cover is passed through the hook lock near one side of ventral and is connected with the fuselage. The vaulting pole is arranged inside the fuselage and its one end is connected with the radar mounting platform, the other end is connected with the radome cover. The vaulting pole is provided with a self-lock device. The vaulting pole length remains unchanged through the self-lock device after a complete opening of the radome cover.

Thus, the document discloses a radome cover that is easily dismountable. However, the radome cover is not a complete dome, but rather a half-dome and/or the aircraft has no equipment installed at the forefront of the dome. Thus, the radome cover can perform just a simple rotation without a forward longitudinal movement.

Other state-of-the-art includes radome covers with an opening kinematics that performs a simple rotation or a rotation after a longitudinal movement involving a rod.

For example, the document U.S. Pat. No. 9,608,320 B2 describes a method for opening a dome for the protection of a device to be protected, fitted in a part described as fixed, in which, in the initial position before opening, a generally plane interface separates the dome from the fixed part. The method includes connecting the dome to the fixed part by at least two independent double-link connections that are movable in rotation between the dome and the fixed part. The links in a single connection being fitted in common to the dome and to the fixed part to form overall a pantograph in the shape of an isosceles trapezium which, during opening, opens out by pivoting until maximum opening is achieved, so that the dome moves away from the fixed part via a combination of movements in translation and in rotation.

In fact, a connecting pair and two telescopic rods are fixed, at their extremities, to the inner rim of the radome cover and to the face of the radome cover via appropriate hinges and for connection in rotation. Each telescopic rod is positioned vertically to the common fitting of the corresponding connecting pair at a distance greater than the length of the pair. In addition, by virtue of the positioning on a common fitting and at the periphery of the radome, each connecting pair is shorter than the corresponding telescopic rod. Furthermore, the telescopic rods have an automatic locking position corresponding to the maximum final openness of the radome relative to the face of the fuselage.

Document U.S. Pat. No. 6,796,529 B1 describes a strut for propping open the door of an aircraft including an outer tube connected at one end to the aircraft and a telescoping inner member connected to the aircraft door. The inner member is extended out of the outer tube when the door is fully opened and automatically locks in place. The strut can be unlocked by grasping a sleeve mounted on the outer tube, pulling it downwardly while rotating the same clockwise. The strut remains locked until the door is lifted upwardly until it stops thereby unlocking the strut. Lowering the door returns the strut to its stowed position with the inner member received within the outer tube.

Document U.S. Pat. No. 5,820,077 A describes a radome structure having an integrally attached attaching structure for attachment to an aircraft, the attaching structure being affixed to a rearward portion of the radome.

Document U.S. Pat. No. 2,943,756 A describes a radome cover of generally hemispherical configuration that is pivotally mounted on the body of an airplane at its upper marginal edge by a usual double-leaf hinge having one of its leaves secured to the radome cover and the other to the body of the airplane as by nuts and bolts or in any other conventional fashion. Carried by a shaft are two triangular truss assemblies, each assembly formed of a pair of braces, which extend from connections with torque shaft at their inner ends to join at an apex. The braces are secured to each other at the V-shaped juncture of their outer extremities as by welding and are secured to the torque shaft as by welding, for common movement therewith. As shown, in their connection to the torque shaft, a first brace will be located on one side of a bearing block and a second brace on the opposite side. At the V-shaped juncture of each of the truss assemblies there is formed a slot within which is secured, as by welding, a plate. Each of the pair of plates extends beyond the outer end of its truss and projects into a space provided between a pair of track-engaging or slide members, and each is pivotally connected to its associated pair of members by a bolt and nut.

The document US2017062920 describes a radome that covers a radar system positioned under the fuselage of a fixed wings aircraft. The radar system is positioned within an internal volume of a shell in which is forming the radome covering the radar system. A track attached to the radome is engaged with a corresponding track attached to the aircraft structure, for a sliding mutual engagement. Bearings as roller balls or ball bearings, are positioned relatively the tracks so as to allow rectilinear sliding of the radome. Only when slid to an axially extended position the radome can possibly reach an expanded position. When in expanded position, articulated arms can be oriented at an angle with respect to the axial direction of the tracks. This is to give the radome a fully unwrapped position. Some bearings are provided on opposing sides of the guiding rail.

The document U.S. Pat. No. 3,374,972 describes a door for the cargo compartment of an aircraft, which forms an aerodynamic aft portion of fuselage and swings vertically in visor fashion from the fuselage to an overhead position. The door is articulated to the fuselage by hinges. A free end of the door is connected to the fuselage through power actuator means. Also, symmetrically disposed on each side of the fuselage are fixed hinge connections in the form of pivots, which are secured to structure of the aircraft. The door is also connected to stationary aircraft structure by a mechanism capable of forcibly driving in various positions. Internally the door carries a fixed structural rib that is curved describing an arc of a circle drawn about the hinge connections. This structural rib is secured to inner surface of the door and to an outer surface aircraft structure, via a bulkhead. The structural rib carries a gear track on each side, for constant meshing coaction with a drive gear projecting from a wall of the structure. The gears are symmetrically disposed about the transverse center of the aircraft and are driven in unison in opposite directions by conventional driving means inside the aircraft. Parallelly disposed on the rib adjacent each track is a guide to engage a pair of rollers that straddle each gear. Each pair of rollers are carried by a support secured to and projecting from the structure, whereby to ensure the constant engagement of the gears in their respective tracks and to prevent relative lateral movement of the door during its vertical swinging movement.

The documents CN207565827, FR2379434 or U.S. Pat. No. 4,174,609 and DE1481684 were also cited.

In summary, many state-of-the-art aircrafts have radome covers with radome cover shells and radome cover opening kinematics that use hinges only for a rotational movement or hinges combined with rods for a longitudinal movement followed by a rotational movement during the opening of the radome cover shell and a rotational movement followed by a longitudinal movement during the closing of the radome cover shell. Radomes having radome covers with radome cover opening kinematics that omit a longitudinal movement cannot house equipment at the forefront of the radome, thereby wasting space. Radomes having radome covers with radome cover opening kinematics that perform a longitudinal movement often rely on a sliding mechanism involving rods within guiding tubes to perform the longitudinal movement.

However, as mentioned above, such a sliding mechanism is sensitive to dirt and has to be adjusted precisely during installation to avoid twisting and blocking of the rod inside the guiding tube. Furthermore, the sliding mechanism introduces high bending moments and loads into the guiding tube when the rod is pulled out of the guiding tube. Thus, a lightweight design of the sliding mechanism with the rod and the guiding tube is difficult to achieve and requires a lot of space.

BRIEF SUMMARY OF THE INVENTION

It is, therefore, an objective to provide an aircraft with a new radome cover shell and opening kinematic. The new radome cover shell and opening kinematic should have a lightweight design, require little space, and be robust, easy to install, and comparably insensitive to dirt.

The objective is solved by an aircraft comprising the features of claim 1. More specifically, an aircraft with an aircraft structure may comprise a radome cover shell and a radome cover shell opening kinematic. The radome cover shell may be adapted to enclose equipment in a nose region of the aircraft in a closed position. The radome cover opening kinematic may enable a first movement of the radome cover shell from the closed position to an opened position and a second movement of the radome cover shell from the opened position to the closed position. The radome cover opening kinematic comprises a guiding rail that is attached to the radome cover shell, and at least three rollers that are attached to the aircraft structure, wherein a first and a second roller of the at least three rollers are arranged on opposing sides of the guiding rail, and wherein the second and a third roller of the at least three rollers are arranged on the same side of the guiding rail. The first movement of the radome cover shell from the closed position to the opened position comprises a longitudinal movement from the closed position to a first partially opened position, a first rotational movement from the first partially opened position to a second partially opened position, and a second rotational movement from the second partially opened position to a completely opened position, wherein the radome shell opening kinematic further comprises a radome cover shell rotation stopper that stops the second rotational movement of the radome cover shell at the completely opened position.

Illustratively, the radome cover opening kinematic comprises a rail that is installed at the radome cover shell and is guided by rollers that are installed on the airframe structure.

The radome cover opening kinematic allows a sequential longitudinal movement and a rotational movement of the radome cover shell during the opening of the radome cover shell to avoid contact with equipment that is installed in the recess of the aircraft and covered by the radome cover shell when the radome cover shell is in the closed position.

Thus, any longitudinal movement of the radome cover shell is guided by rollers and not by sliding. For that purpose, three rollers guide a motion link with a rail. The motion link is movable and fixed to the radome cover shell while the rollers remain in their position.

The rollers reduce the friction and ensure a smooth motion during the longitudinal movement. The distance between the rollers results in a better load distribution and lower forces on the guiding rail.

The point of attack of the operating forces for opening and closing does not need to be centered between the two hinges; the allowable tolerance for an asymmetric push or pull force is much wider.

The guidance perpendicular to the movement plane is improved during the longitudinal movement.

The radome cover opening kinematic requires less space in length compared to state-of-the-art solutions with a rod and a guiding tube, because there is no remaining rod length necessary behind the hinge point as in those state-of-the-art solutions.

The operation of the radome cover opening kinematic is improved at very high or very low temperatures compared to state-of-the-art solutions.

The radome cover opening kinematic is less susceptible to dirt and dust. The motion link with the attached movable part can easily be disassembled and reinstalled from the guiding rail without need for adjustment.

According to one aspect, the aircraft further comprises a radome cover attachment surface that is attached to the radome cover opening kinematic and receives the radome cover shell.

According to one aspect, the aircraft further comprises a roller bearing bracket that is attached to the aircraft structure and receives the at least three rollers.

According to one aspect, the aircraft further comprises a plurality of latches that are adapted to maintain the radome cover shell in the closed position.

According to one aspect, a latch of the plurality of latches further comprises an eye that is attached to the radome cover shell; a latch hook that engages with the eye in the closed position; and a biasing device that biases the latch hook to stay engaged with the eye.

According to one aspect, the latch of the plurality of latches further comprises an alignment pin and an alignment fork, wherein the alignment pin and the alignment fork guide the eye towards the latch hook during at least a portion of the second movement of the radome cover shell from the opened position to the closed position.

According to one aspect, the guiding rail further comprises a curved end that engages with the first roller to form a guiding rail rear stopper that stops the longitudinal movement of the radome cover shell at the first partially opened position.

According to one aspect, the first roller defines a rotation axis around which the radome cover shell rotates during the first and second rotational movements of the radome cover shell.

According to one aspect, the aircraft further comprises a roller guide that is attached to the radome cover shell, wherein at least the third roller of the at least three rollers is arranged between the guiding rail and the roller guide when the radome cover shell is in the closed position.

According to one aspect, the roller guide further comprises a first portion that is parallel to the guiding rail; and a second portion that is kinked away from the guiding rail at a predetermined angle.

According to one aspect, the third roller is in contact with the second portion of the roller guide during the first rotational movement of the radome cover shell.

According to one aspect, the roller guide is removed from the third roller during the second rotational movement of the radome cover shell.

According to one aspect, the aircraft further comprises a rod having a first and a second end, wherein the first end is attached to the aircraft structure; and a rod holder bracket that is mounted on the radome cover shell and adapted to receive the second end of the rod when the radome cover shell is in the completely opened position.

According to one aspect, the aircraft further comprises a rod retainer bracket that is mounted on the aircraft structure and adapted to receive the second end of the rod when the radome cover shell is in the closed position.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
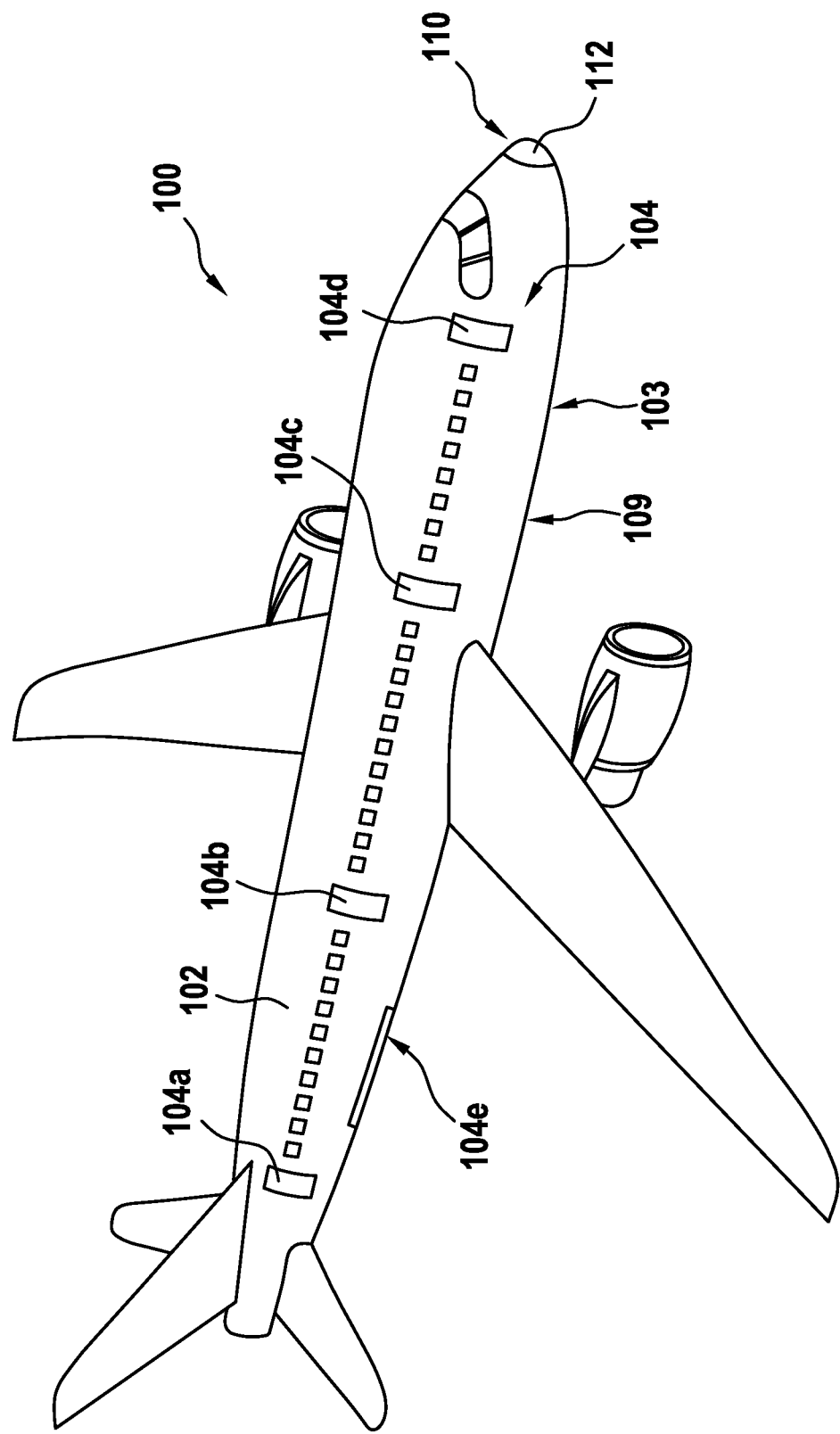
FIG. 1 shows a perspective view of an illustrative aircraft having a radome with a radome cover that includes a radome cover shell and a radome cover opening kinematic in accordance with some embodiments.

FIG. 1 shows an aircraft 100 with an aircraft airframe 102, which is sometimes also referred to as fuselage 102. Illustratively, aircraft 100 is an airplane. However, the present embodiments are not limited to airplanes. Instead, any vehicle with a radome such as a vertical take-off and landing (VTOL) aircraft, a helicopter, a drone, etc. is likewise contemplated.

If desired, the aircraft 100 is accessible via a plurality of aircraft doors 104, which exemplarily comprises several cabin access doors 104a, 104b, 104c and 104d, as well as one or more cargo deck access doors 104e.

The plurality of aircraft doors 104 may be adapted to close the aircraft airframe 102 (i.e., fuselage 102 of the aircraft 100) in a fluid-tight manner.

Fuselage 102 may include an aircraft structure 103 and an aircraft skin 109 that is attached to aircraft structure 103. As an example, aircraft 100 may include a radome with a radome cover located at the nose region of aircraft 100. The radome cover may include a radome cover shell 112 and a radome cover opening kinematic. The radome cover shell 112 may be a part of aircraft skin 109.

If desired, radome cover shell 112 may enclose equipment 115 in the nose region 110 of the aircraft 100. For example, radome cover shell 112 may enclose equipment 115 such as radar antennas, if desired.

Figure 2A:
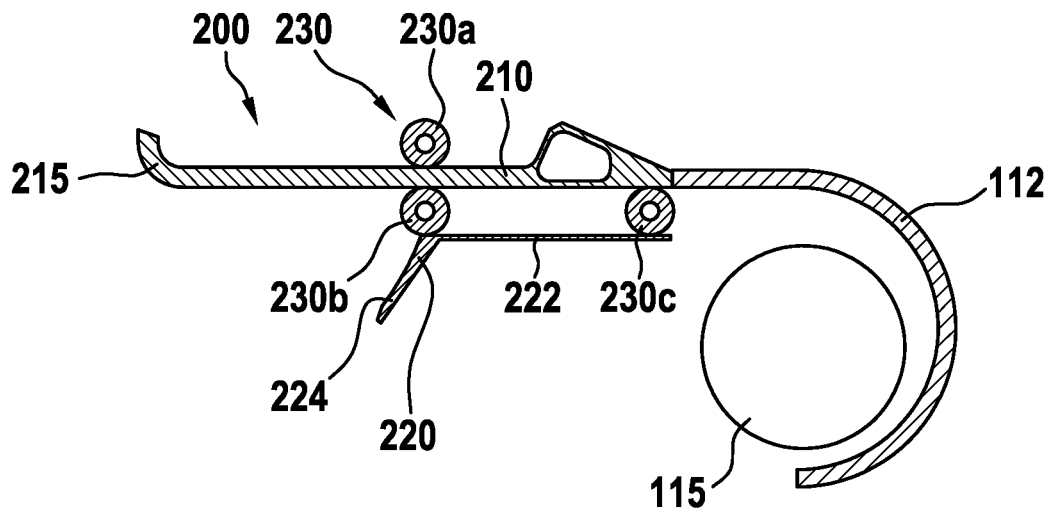
FIG. 2A is a diagram of an illustrative radome cover with a radome cover shell and a radome cover opening kinematic in a closed position in accordance with some embodiments.

FIG. 2A is a diagram of an illustrative radome cover with a radome cover opening kinematic 200 and a radome cover shell 112 in a closed position. The radome cover shell 112 is adapted to enclose equipment 115 in a nose region of an aircraft (e.g., nose region 110 of aircraft 100 of FIG. 1) in the closed position shown in FIG. 2A.

Illustratively, radome cover opening kinematic 200 may include guiding rail 210 and at least three rollers 230. If desired, radome cover opening kinematic 200 may include roller guide 220. Roller guide 220 may include a first portion 222 that is parallel to the guiding rail 210. If desired, roller guide 220 may include a second portion 224 that is kinked away from the guiding rail 210 at a predetermined angle.

As shown in FIGS. 2A to 2D, radome cover opening kinematic 200 may include three rollers 230a, 230b, 230c. However, radome cover opening kinematic 200 may include more than three rollers, if desired. As an example, radome cover opening kinematic 200 may include additional rollers between rollers 230b and 230c.

By way of example, guiding rail 210 and roller guide 220 may both be attached to radome cover shell 112. The at least three rollers 230 may be attached to aircraft structure 103.

Illustratively, a first and a second roller 230a, 230b of the at least three rollers 230 may be arranged on opposing sides of the guiding rail 210. The second and a third roller 230b, 230c of the at least three rollers 230 may be arranged on the same side of the guiding rail 210.

Figure 2B:
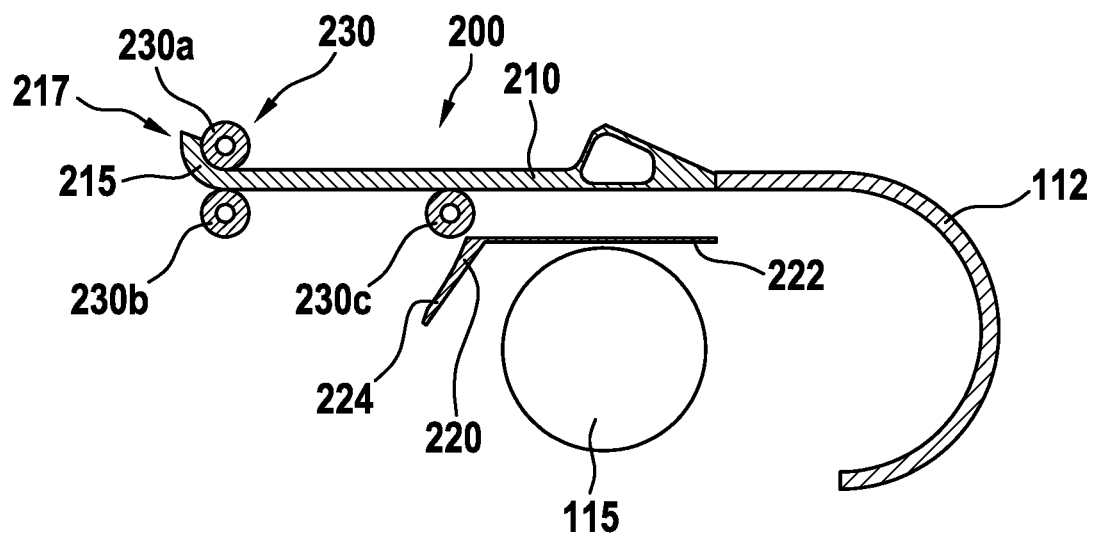
FIG. 2B is a diagram of an illustrative radome cover with a radome cover shell and a radome cover opening kinematic at the end of a longitudinal movement from the closed position of FIG. 2A to a first partially opened position in accordance with some embodiments.

At least the third roller 230c may be located between guiding rail 210 and the first portion 222 of roller guide 220 during a longitudinal movement of the radome cover shell 112 from the closed position shown in FIG. 2A to a first partially opened position shown in FIG. 2B. Thus, the first portion 222 of roller guide 220 and roller 230c may prevent a rotational movement of radome cover shell 112 while roller 230c is between guiding rail 210 and the first portion 222 of roller guide 220 (i.e., during the longitudinal movement of radome cover shell 112).

Guiding rail 210 may have a straight portion to enable a longitudinal movement of the radome cover shell 112 along the plurality of rollers 230. If desired, guiding rail 210 may include a curved end 215. Curved end 215 may engage with first roller 230a to form a guiding rail rear stopper 217 that stops the longitudinal movement of the radome cover shell 112 at the first partially opened position.

Placing rollers 230a and 230b opposing each other on opposing sides of guiding rail 210 may prevent a rotational movement of radome cover shell 112 until curved end 215 engages with first roller 230a.

FIG. 2B is a diagram of an illustrative radome cover with radome cover opening kinematic 200 and radome cover shell 112 at the end of the longitudinal movement from the closed position of FIG. 2A to a first partially opened position in accordance with some embodiments.

As shown in FIG. 2B, curved end 215 engages with the first roller 230a to form guiding rail rear stopper 217. Guiding rail rear stopper 217 (i.e., curved end 215 together with roller 230a) stops the longitudinal movement of the radome cover shell 112 at the first partially opened position and prevents any further longitudinal movement of radome cover shell 112.

In the first partially opened position, roller 230c is no longer located between guiding rail 210 and the first portion 222 of roller guide 220. Thus, roller 230c may no longer prevent a rotational movement of radome cover shell 112 around an axis defined by roller 230a (i.e., a counterclockwise rotation of radome cover shell 112 around roller 230a as shown in FIG. 2B) in the first partially opened position. However, roller 230c still prevents a rotational movement of radome cover shell 112 around an axis defined by roller 230b (i.e., a clockwise rotation of radome cover shell 112 around roller 230b as shown in FIG. 2B) in the first partially opened position.

Figure 2C:
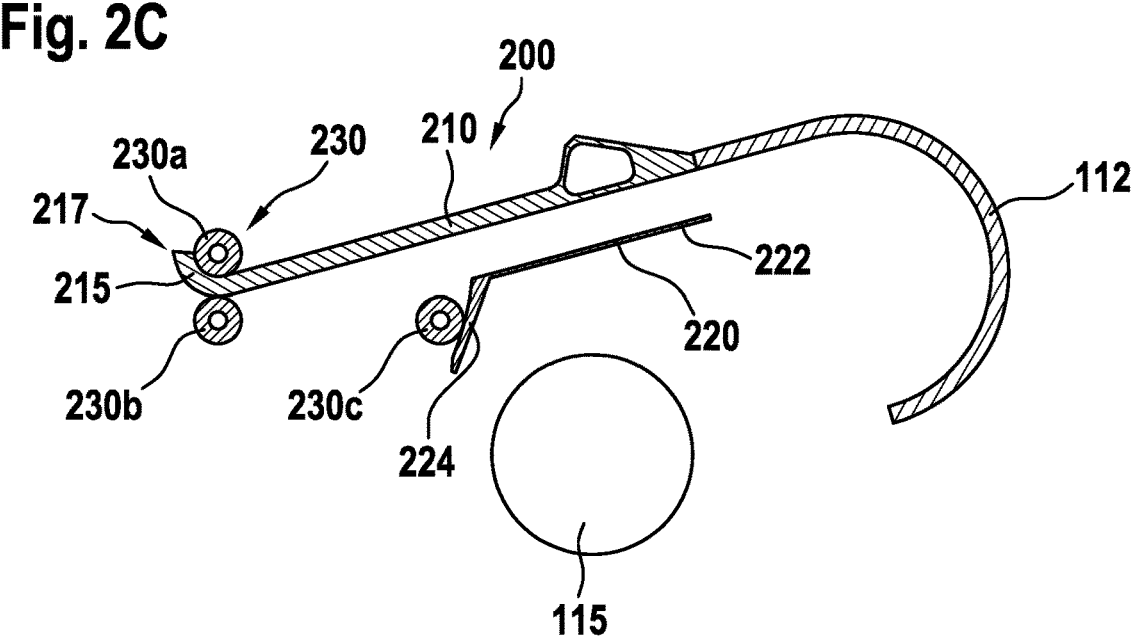
FIG. 2C is a diagram of an illustrative radome cover with a radome cover shell and a radome cover opening kinematic during a first rotational movement from the first partially opened position of FIG. 2B to a second partially opened position in accordance with some embodiments.

In fact, upon reaching the first partially opened position, radome cover shell 112 is free to perform a first rotational movement from the first partially opened position to a second partially opened position as illustrated in FIG. 2C.

As shown in FIG. 2C, roller 230a defines a rotation axis around which radome cover shell 112 rotates during the first rotational movement of radome cover shell 112. If desired, roller 230c may be in contact with the second portion 224 of roller guide 220 at least during a portion of the first rotational movement from the first partially opened position to the second partially opened position of radome cover shell 112.

In other words, roller 230a and curved end 215 may at least in part define the first rotational movement of radome cover shell 112, and the second portion 224 of roller guide 220 and roller 230c may support the definition of the first rotational movement of radome cover shell 112. If desired, the second portion 224 of roller guide 220 together with roller 230c may guide the radome cover shell 112 during a closing movement between the second partially opened position and the first partially opened position.

Figure 2D:
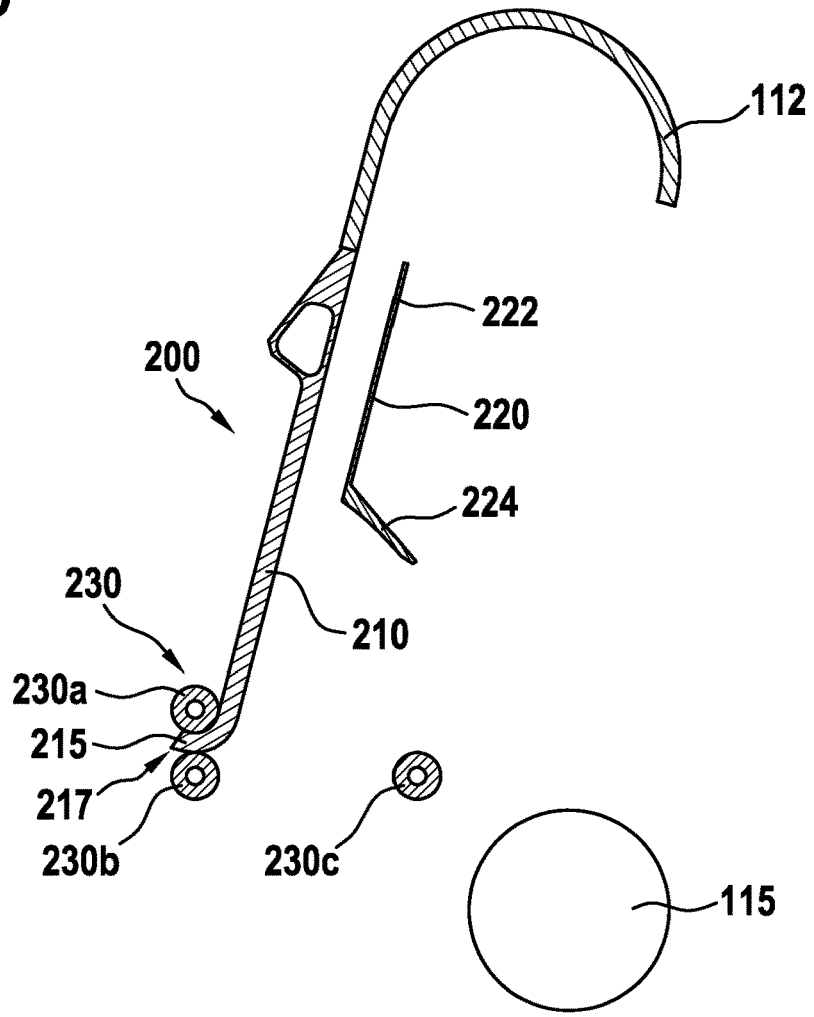
FIG. 2D is a diagram of an illustrative radome cover with a radome cover shell and a radome cover opening kinematic during a second rotational movement from the second partially opened position to a completely opened position in accordance with some embodiments.

If desired, radome cover shell 112 may perform a second rotational movement from the second partially opened position to a completely opened position. FIG. 2D shows radome cover shell 112 in the completely opened position.

Illustratively, roller 230c may not be in contact with the second portion 224 of roller guide 220 during the second rotational movement. If desired, the radome shell opening kinematic 210 may include a radome cover shell rotation stopper that stops the second rotational movement of the radome cover shell 112 at the completely opened position.

Figure 3:
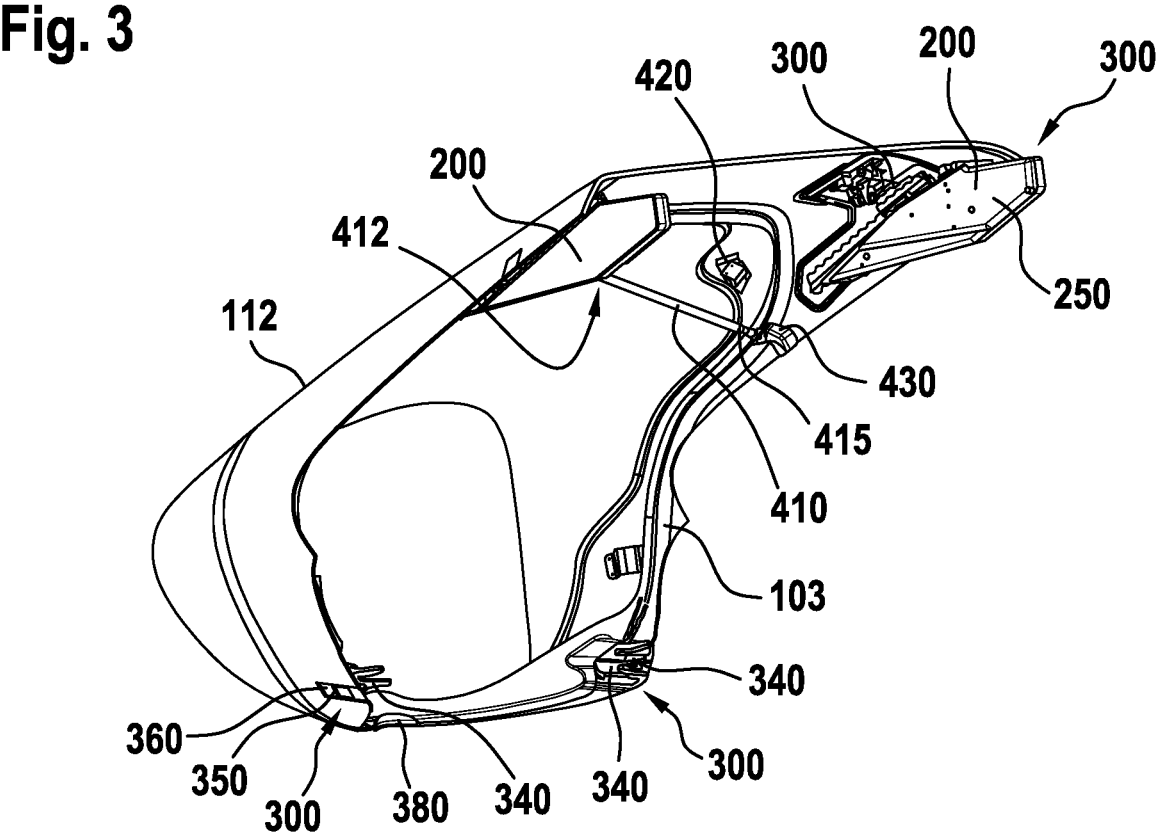
FIG. 3 shows an isometric view of an illustrative radome cover with a radome cover, a radome cover opening kinematic, latches, locks, a rod, and a rod holder bracket in accordance with some embodiments.

FIG. 3 shows an isometric view of an illustrative radome cover. The radome cover may include radome cover shell 112, radome cover opening kinematic 200, and latches and/or locks 300. If desired, the radome cover may include one or more rods 410 and corresponding one or more rod holder brackets 420 to maintain the radome cover shell 112 in the completely opened position.

Latches and/or locks 300 may be adapted to maintain radome cover shell 112 in the closed position. Illustratively, a latch and/or lock 300 may include an eye that is attached to radome cover shell 112 and a latch hook that is attached to an aircraft structure (e.g., aircraft structure 103 of FIG. 1). If desired, the eye of latch and/or lock 300 may be attached to the aircraft structure, while the latch hook is attached to the radome cover shell 112.

The latch hook may engage with the eye in the closed position of radome cover shell 112. The illustrative latch and/or lock 300 may include an alignment pin and/or an alignment fork 340. The alignment pin and/or the alignment fork 340 may guide the eye towards the latch hook during at least a portion of the second movement of the radome cover shell 112 from the opened position to the closed position.

If desired, the latch and/or lock may include a biasing device that biases the latch hook to stay engaged with the eye. For example, the biasing device may include a spring.

During the movement of the radome cover shell 112 from an opened to the closed position, the eye may push the latch hook from its biased position against the force of the spring. When the radome cover shell 112 has reached the closed position, the spring may push the latch hook back into its biased position in which it engages with the eye to maintain the radome cover shell 112 in its closed position.

If desired, latch and/or lock 300 may include release push button 350 and/or unlatch handle 360. Release push button 350 and/or unlatch handle 360 may be adapted to disengage the latch hook from the eye. For example, release push button 350 and/or unlatch handle 360 may push against the force of the biasing device and move the latch hook from its biased position.

As shown in FIG. 3, the radome cover may include four latches and/or locks 300. If desired, the radome cover may have a different number of latches and/or locks 300. For example, the radome cover may include one, two, three, five, six, or any other number of latches and/or locks 300. Latches and/or locks 300 are described in more detail in FIGS. 7A, 7B, and 8.

By way of example, the radome cover may include one or more opening handles 380. The one or more opening handles 380 may be adapted to provide a handle to an operator who moves the radome cover shell 112 from the closed to an opened position and/or from the opened to the closed position.

By way of example, the one or more rods 410 may have a first end 412 and a second end 415. The second end 415 of rod 410 may be attached to the aircraft structure 103.

The corresponding one or more rod holder brackets 420 may be mounted to the radome cover shell 112 and adapted to receive the respective second ends 415 of the corresponding rods 410 when the radome cover shell 112 is in the completely opened position. Thereby, the one or more rods 410 and the corresponding one or more rod holder brackets 420 may maintain the radome cover shell 112 in the completely opened position.

If desired, one or more rod retainer brackets 430 may be mounted on the aircraft structure 103. The one or more rod retainer brackets 430 may be adapted to receive the respective second ends 415 of the corresponding rods 410 when the radome cover shell 112 is in the closed position. Thereby, the respective second ends 415 of rods 410 may be safely stowed away when the radome cover shell 112 is in the closed position.

Illustratively, a roller bearing bracket 250 may be attached to the aircraft structure 103. The roller bearing bracket 250 is described in more detail in FIG. 4.

Figure 4:
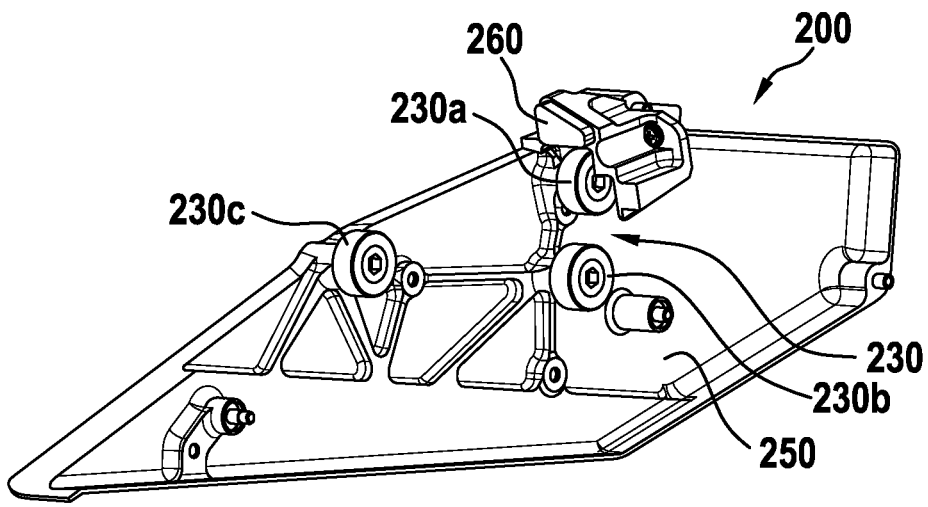
FIG. 4 shows a three-dimensional view of a portion of an illustrative radome cover opening kinematic in accordance with some embodiments.

FIG. 4 shows a three-dimensional view of a portion of an illustrative radome cover opening kinematic 200 with a roller bearing bracket 250 in accordance with some embodiments.

Roller bearing bracket 250 may receive at least three rollers 230 such as rollers 230a, 230b, and 230c. Illustratively, roller bearing bracket 250 may receive guiding rail rear stopper 217. Thus, the portions of the radome cover opening kinematic 200 that are attached to the roller bearing bracket 250 may be quickly and easily replacement by replacing the roller bearing bracket 250 with all attached parts.

Illustratively, roller bearing bracket 250 may be closed to prevent water penetration and thereby reduce the risk of corrosion. If desired, roller bearing bracket 250 may be inclined for drainage so that water cannot accumulate, thereby further reduce the risk of corrosion.

By way of example, roller bearing bracket 250 may include a frame that encompasses a truss. The truss may include a plurality of beams to provide for increased stability. Roller 230c may be mounted to the frame, if desired. A beam may connect rollers 230b and 230c, and another beam may connect rollers 230a and 230b.

The frame may have the shape of an irregular hexagon. At least some vertices of the hexagon may have first reinforcements. The first reinforcements may protrude towards the inside of the frame.

Illustratively, roller bearing bracket 250 may have second reinforcements at least in some locations in which beams of the truss intersect with each other. First and second reinforcements may have any shape. For example, reinforcements may be round, triangular, rectangular, etc.

If desired, roller bearing bracket 250 may be attached with the aircraft structure through at least some of the vertices of the frame and/or through some of the first and/or second reinforcements.

Figure 5:
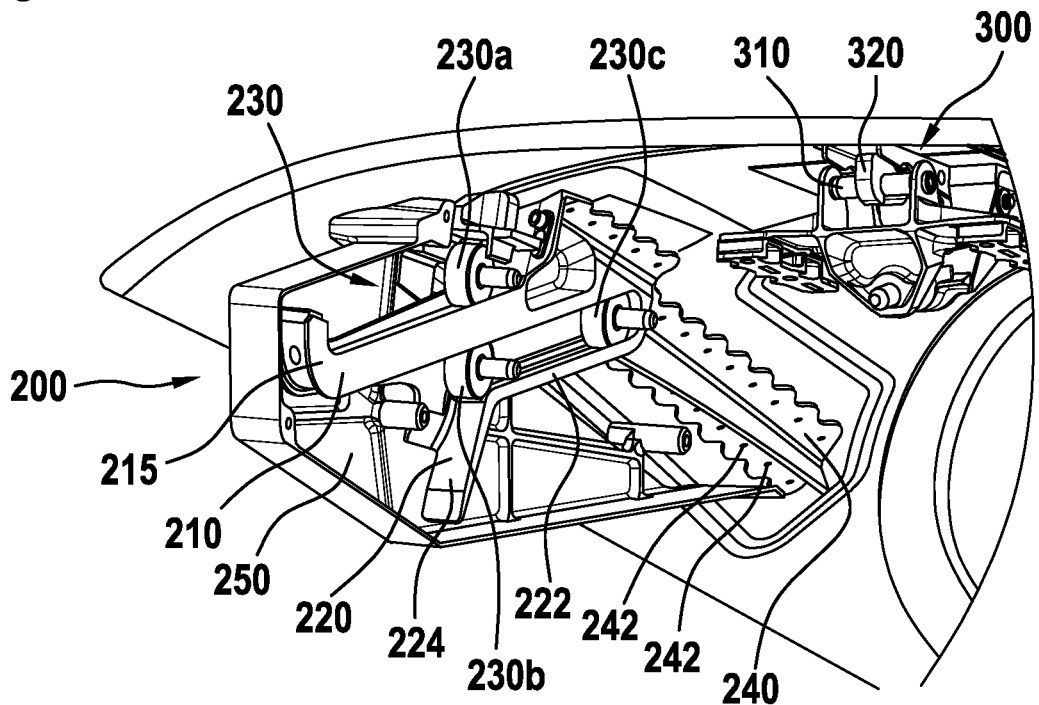
FIG. 5 shows a three-dimensional view of the inside of an illustrative radome cover having a radome cover opening kinematic and a radome cover shell in the closed position in accordance with some embodiments.

FIG. 5 shows a three-dimensional view of the inside of an illustrative radome cover having a radome cover opening kinematic and a radome cover shell in the closed position in accordance with some embodiments.

The illustrative radome cover may include a radome cover attachment surface 240. Radome cover attachment surface 240 may be attached to the radome cover opening kinematic 200. If desired, the radome cover attachment surface 240 may receive the radome cover shell 112.

As an example, radome cover attachment surface 240 may include bore holes 242 and radome cover shell 112 may be attached to radome cover attachment surface 240 with fasteners that attach with bore holes 242.

Any type of fasteners may be used to attach radome cover shell 112 to radome cover attachment surface 240. Fasteners may include screws, bolts and nuts, pins, rivets, nails, clips, clamps, brackets, or any other type of fastener that may be suitable to attach radome cover shell 112 to radome cover attachment surface 240. If desired, radome cover shell 112 may be soldered and/or glued to radome cover attachment surface 240.

Radome cover opening kinematic 200 may include guiding rail 210. Guiding rail 210 may be straight and have a curved end 215. As shown in FIG. 5, guiding rail 210 may have a U-shaped profile and at least one roller of the plurality of rollers 230 (e.g., roller 230a) may move within the U-shaped profile.

If desired, guiding rail 210 may have an H-shaped profile and all rollers of the plurality of rollers 230 (e.g., rollers 230a, 230b, 230c) may move on either side of the guiding rail 210 within the H-shaped profile.

Illustratively, radome cover opening kinematic 200 may include roller guide 220. Roller guide 220 may have a first portion 222 that is parallel to the guiding rail 210 and a second portion 224 that is kinked away from the guiding rail 210 at a predetermined angle.

If desired, the first portion 222 and/or the second portion 224 of roller guide 220 may have a U-shaped profile. By way of example, at least one roller of the plurality of rollers 230 (e.g., roller 230c) may move within the U-shaped profile.

As shown in FIG. 5, the illustrative radome cover may include a latch and/or lock 300 that is adapted to maintain radome cover shell 112 in the closed position. Illustratively, the latch and/or lock 300 may include an eye 310 that is attached to radome cover shell 112.

A latch hook 320 may be attached to the aircraft structure. The latch hook 320 may engage with the eye 310 in the closed position. If desired, latch hook 320 may be attached to radome cover shell 112 and eye 310 to the aircraft structure.

Figure 6A:
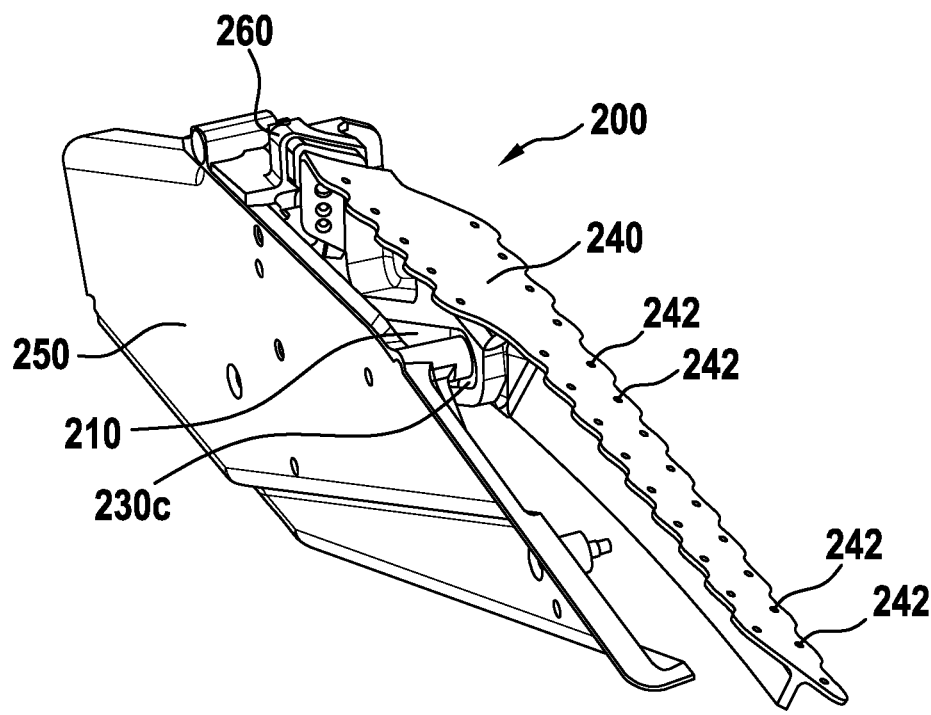
FIG. 6A shows a three-dimensional view of an illustrative radome cover opening kinematic when a corresponding radome cover shell is in the closed position in accordance with some embodiments.

FIG. 6A shows a three-dimensional view of an illustrative radome cover opening kinematic when a corresponding radome cover shell (e.g., radome cover shell 112 of FIGS. 1 to 3) is in the closed position in accordance with some embodiments.

Illustratively, roller bearing bracket 250 may have a plate to which the truss of FIG. 4 may be attached. If desired, roller bearing bracket 250 may be attached with the aircraft structure through the plate.

Roller bearing bracket 250 may be at least partially made of composite material. If desired, roller bearing bracket 250 may be at least partially made of metal.

As shown in FIG. 6A, radome cover attachment surface 240 may be attached to the radome cover opening kinematic 200. If desired, radome cover attachment surface 240 may include bore holes 242 and a radome cover shell may be attached to radome cover attachment surface 240 with fasteners that attach with bore holes 242.

Figure 6B:
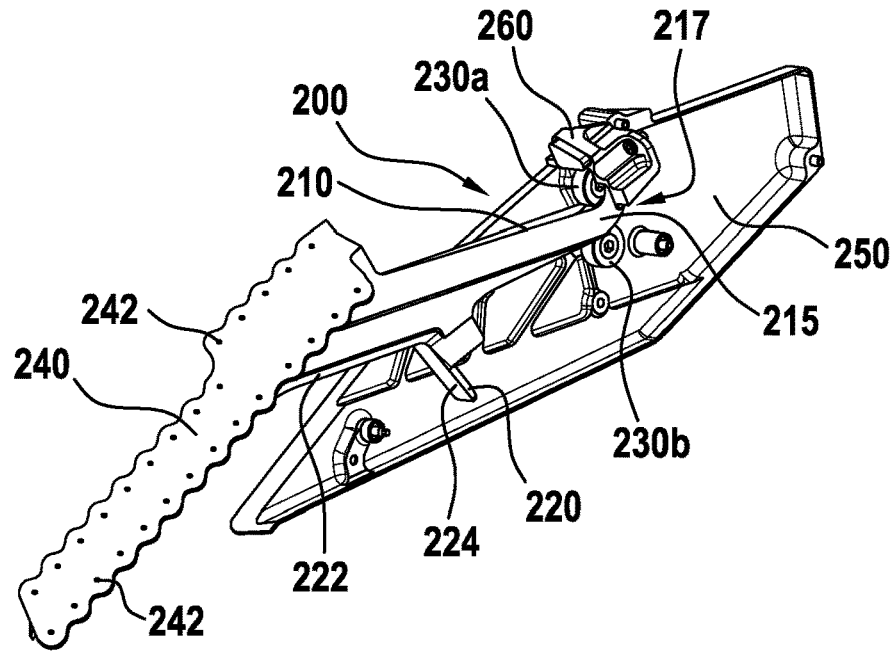
FIG. 6B shows a three-dimensional view of the illustrative radome cover opening kinematic of FIG. 6A at the end of a longitudinal movement from the closed position of FIG. 6A to a first partially opened position of the radome cover shell in accordance with some embodiments.

FIG. 6B shows a three-dimensional view of the illustrative radome cover opening kinematic of FIG. 6A at the end of a longitudinal movement from the closed position of FIG. 6A to a first partially opened position of the radome cover shell in accordance with some embodiments.

As shown in FIG. 6B, curved end 215 of guiding rail 210 engages with the first roller 230a to form guiding rail rear stopper 217. Guiding rail rear stopper 217 (i.e., curved end 215 together with roller 230a) stops the longitudinal movement of the radome cover shell at the first partially opened position and prevents any further longitudinal movement of the radome cover shell other than a longitudinal movement back towards the closed position of FIG. 6A.

If desired, guiding rail rear stopper 217 may include roller 230b in addition to curved end 215 and roller 230a. Thus, guiding rail rear stopper 217 may prevent any movement that is different than a rotational movement around an axis defined by roller 230a or a longitudinal movement of the radome cover shell towards the closed position of FIG. 6A.

Upon reaching the first partially opened position, the radome cover shell is free to perform a rotational movement.

Figure 6C:
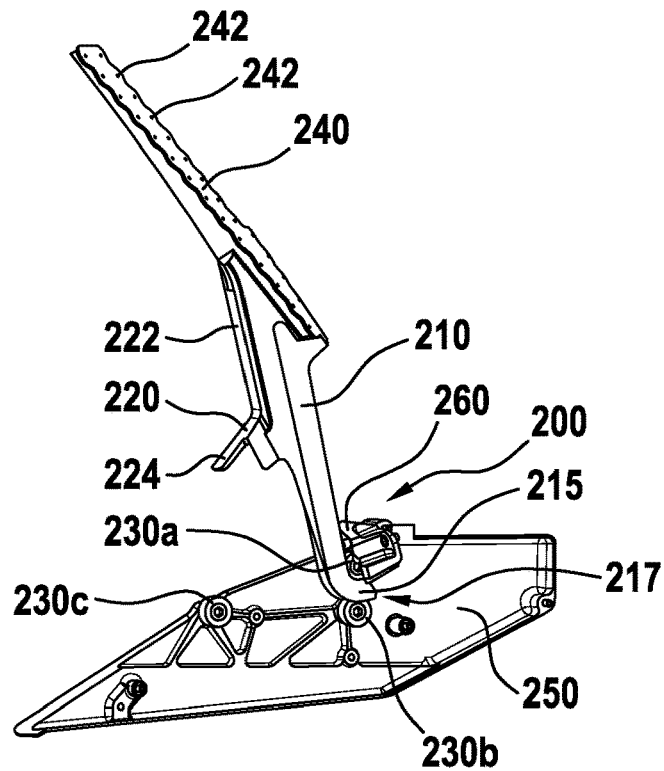
FIG. 6C shows a three-dimensional view of the illustrative radome cover opening kinematic of FIG. 6B during a rotational movement from the first partially opened position of FIG. 6B to a completely opened position of the radome cover shell in accordance with some embodiments.

FIG. 6C shows a three-dimensional view of the illustrative radome cover opening kinematic of FIG. 6B during a rotational movement from the first partially opened position of FIG. 6B to a completely opened position of the radome cover shell in accordance with some embodiments.

At the completely opened position, radome cover shell rotation stopper 260 stops the second rotational movement of the radome cover shell. For example, during the second rotational movement, guiding rail 210 may reach radome cover shell rotation stopper 260, which may prevent guiding rail 210 from performing any further rotational movement.

Figure 6D:
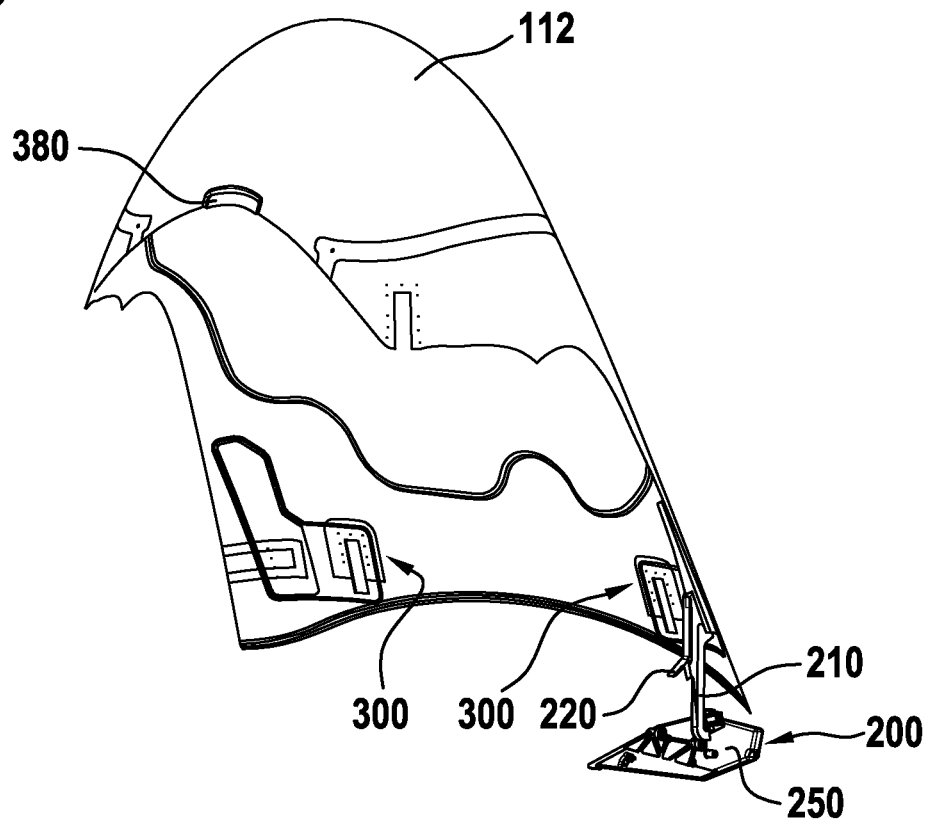
FIG. 6D shows a three-dimensional view of an illustrative radome cover with a radome cover shell attached to the radome cover opening kinematic of FIG. 6C with the radome cover shell being in the completely opened position in accordance with some embodiments.

FIG. 6D shows a three-dimensional view of an illustrative radome cover with a radome cover shell attached to the radome cover opening kinematic of FIG. 6C with the radome cover shell being in the completely opened position in accordance with some embodiments.

As shown in FIG. 6D, the radome cover may include at least two latches and/or locks 300. Latches and/or locks 300 are described in more detail in FIGS. 7A, 7B, and 8.

By way of example, the radome cover may include one or more opening handles 380. The one or more opening handles 380 may be adapted to provide a grip to an operator that moves the radome cover shell 112 from the closed to an opened position and/or from the opened to the closed position.

Figure 7A:
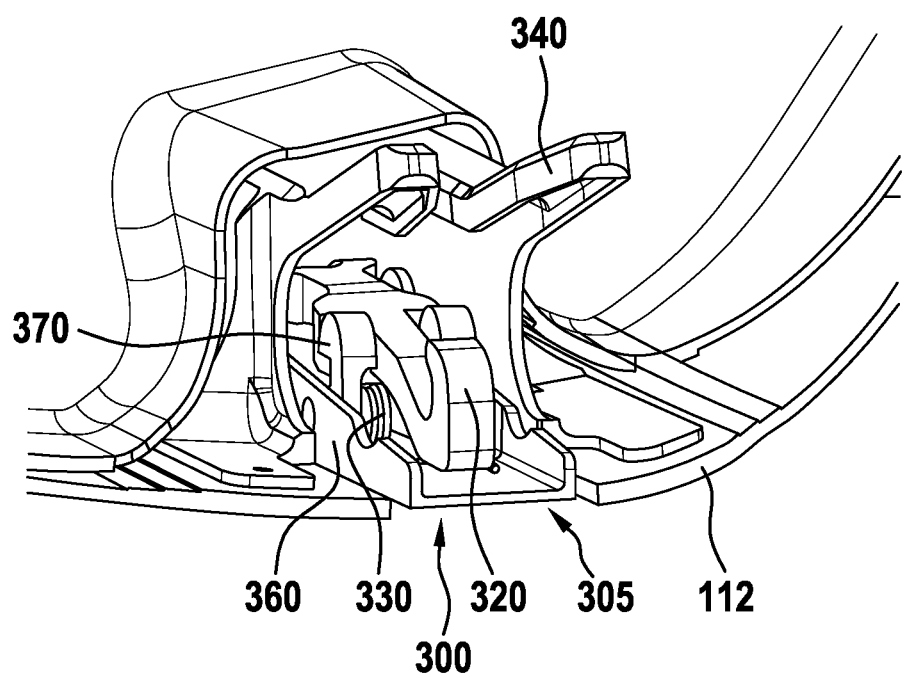
FIG. 7A is a diagram of a portion of an illustrative lower latch and lock mechanism for a radome cover visible at the inside of the radome cover in accordance with some embodiments.

FIG. 7A is a diagram of a portion of an illustrative lower latch and/or lock for a radome cover visible at the inside of the radome cover in accordance with some embodiments.

As shown in FIG. 7A, portion 305 of latch and/or lock 300 may include latch hook 320, biasing device 330, alignment fork 340, unlatch handle 360, and release hook 370. Latch and/or lock 300 may include portion 305 of latch and/or lock 300 and a counterpart portion of latch and/or lock 300. Latch and/or lock 300 may be adapted to maintain radome cover shell 112 in a closed position.

Portion 305 of latch and/or lock 300 may be attached to radome cover shell 112 and the counterpart portion of latch and/or lock 300 may be attached to an aircraft structure (e.g., aircraft structure 103 of FIG. 1). If desired, portion 305 of latch and/or lock 300 may be attached to the aircraft structure and the counterpart portion of latch and/or lock may be attached to radome cover shell 112.

Illustratively, the counterpart portion of latch and/or lock 300 may include an eye. Portion 305 of latch and/or lock 300 may be adapted to receive the eye. For example, latch hook 320 may engage with the eye in the closed position.

If desired, portion 305 of latch and/or lock 300 may include a biasing device 330. Biasing device 330 may bias latch hook 320 into a predetermined position. For example, biasing device 330 may bias latch hook 320 to stay engaged with the eye.

The outside of latch hook 320 may be shaped such that the eye is able to move latch hook 320 out of the biased position during the move of radome cover shell 112 into the closed position. For example, the outside of latch hook 320 may have a kink.

By way of example, biasing device 330 may include a spring that pushes latch hook 320 in direction of alignment fork 340. Unlatch handle 360 may be adapted to move latch hook 320 out of the biased position to enable the release of the eye from latch hook 320. Thus, unlatch handle 360 may push directly or indirectly against biasing device 330 and/or against latch hook 320 such that latch hook 320 is moved out of the biased position.

Release hook 370 may block unlatch handle 360 when latch and/or lock 300 is locked. Release hook 370 may allow unlatch handle 360 to unlatch latch and/or lock 300 when latch and/or lock 300 is unlocked. In other words, release hook 370 may cause a transition of latch and/or lock 300 from a locked state to an unlocked state and vice versa.

Alignment fork 340 may guide the eye towards the latch hook 320 during the movement of the radome cover shell 112 to the closed position. For example, the counterpart portion of latch and/or lock 300 may include a pin that is oriented perpendicular to alignment fork 340 and alignment fork 340 may receive the pin between the two prongs of alignment fork 340.

Figure 7B:
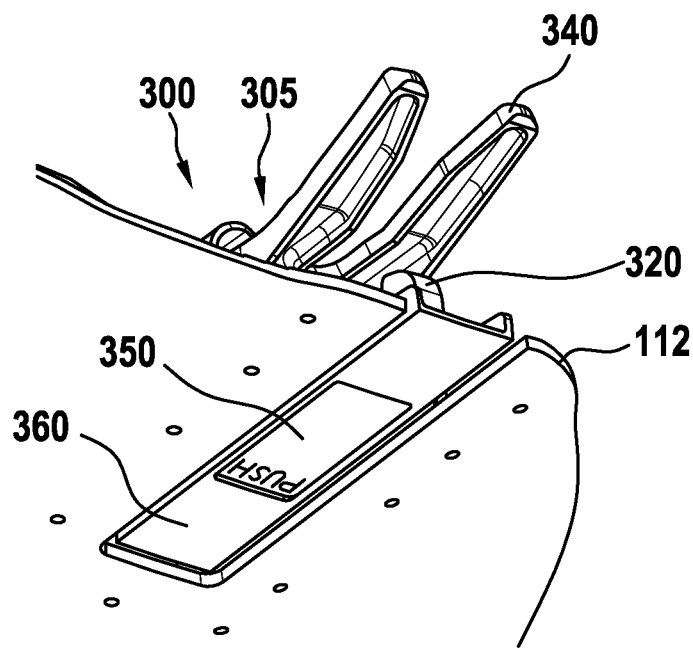
FIG. 7B is a diagram of the portion of the illustrative lower latch and lock mechanism of FIG. 7A visible at the outside of the radome cover in accordance with some embodiments.

FIG. 7B is a diagram of the portion of the illustrative lower latch and lock mechanism of FIG. 7A visible at the outside of the radome cover in accordance with some embodiments. As shown in FIG. 7B, portion 305 of latch and/or lock 300 may include latch hook 320, alignment fork 340, release push button 350, and unlatch handle 360.

Illustratively, release push button 350 may act on release hook 370. As an example, release push button 350 may cause release hook 370 to block unlatch handle 360 when latch and/or lock 300 is in the unlocked state, thereby transitioning latch and/or lock 300 into the locked state. As another example, release push button 350 may cause release hook 370 to allow unlatch handle 360 to unlatch latch and/or lock 300 when latch and/or lock 300 is in the locked state, thereby transitioning latch and/or lock 300 into the unlocked state.

When latch and/or lock 300 is in the unlocked state, unlatch handle 360 may be adapted to move latch hook 320 out of the biased position to enable the release of the eye from latch hook 320.

Figure 8:
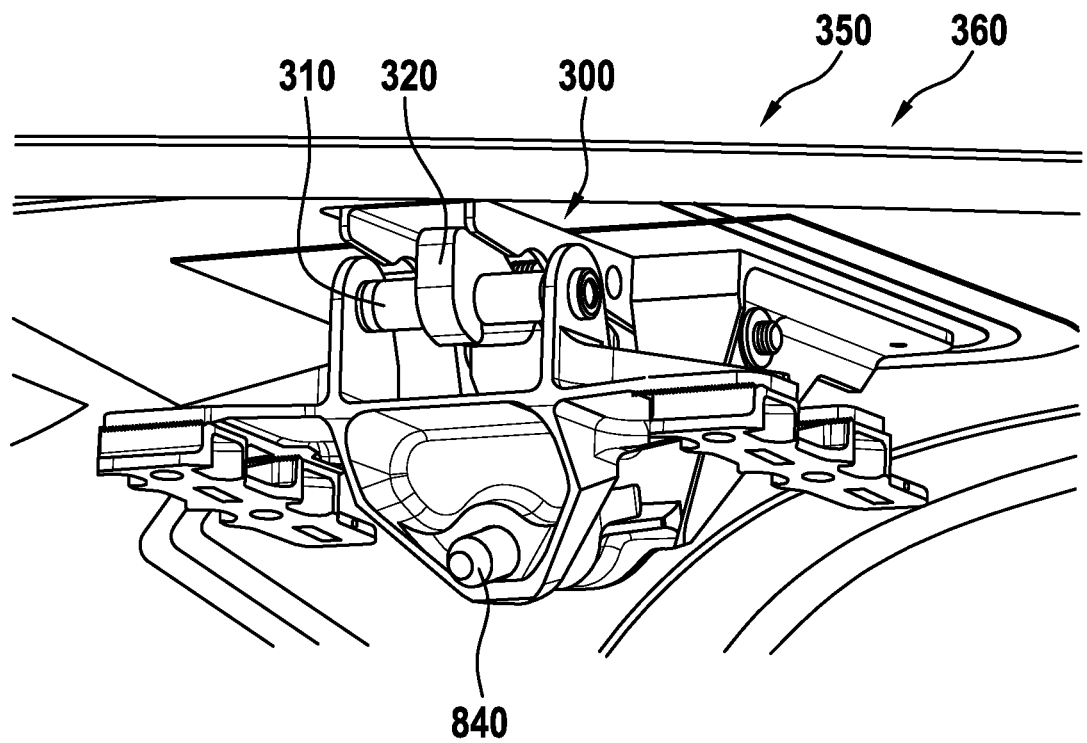
FIG. 8 is a diagram of an illustrative upper latch and lock mechanism for a radome cover visible at the inside of the radome cover in accordance with some embodiments.

FIG. 8 is a diagram of an illustrative upper latch and lock mechanism for a radome cover visible at the inside of the radome cover in accordance with some embodiments. FIG. 8 shows latch and/or lock 300 in a closed state. In the closed state, latch hook 320 has latched onto eye 310. Thus, latch and/or lock 300 maintains radome cover in a closed state.

Illustratively, release push button 350 may act on a release hook that is adapted to block unlatch handle 360. For example, release push button 350 may cause the release hook to allow unlatch handle 360 to unlatch latch and/or lock 300 when latch and/or lock 300 is in the locked state. In other words, release push button 350 may via the release hook cause a transition of latch and/or lock 300 from a locked state to an unlocked state.

If desired, release push button 350 may cause the release hook to block unlatch handle 360 when latch and/or lock 300 is in the unlocked state. In other words, release push button 350 may via the release hook cause a transition of latch and/or lock 300 from an unlocked state to a locked state.

Latch and/or lock 300 may include alignment pin 840. Alignment pin 840 may guide the eye 310 towards the latch hook 320 during the movement of a radome cover shell from the opened position to the closed position.

For example, alignment pin 840 may be located on one portion of latch and/or lock 300 (e.g., on portion 305 of lock and/or latch 300 of FIGS. 7A and 7B). A funnel may be located on the counterpart portion of latch and/or lock 300. The funnel may together with the alignment pin 840 guide the eye 310 towards the latch hook 320, if desired.

Illustratively, latch and/or lock 300 may have an alignment fork. If desired, alignment pin 840 and the alignment fork may both guide the eye 310 towards the latch hook 320 during the movement of the radome cover shell from the opened position to the closed position.

It should be noted that modifications to the above described embodiments are within the common knowledge of the person skilled in the art and, thus, also considered as being part of the present invention.

For instance, latch and/or lock 300 of FIG. 7A is shown with a latch hook 320 that engages with an eye in the closed position of radome cover shell 112. However, any other device that engages with an eye in the closed position is likewise contemplated. For example, latch and/or lock 300 may include a pair of pliers instead of a latch hook 320. The pair of pliers may have a slot that may engage with the eye. Moreover, the biasing device 330 of FIG. 7A may push the prongs of the pair of pliers together instead of pushing latch hook 320 in direction of alignment fork 340.

Furthermore, the second portion 224 of roller guide 220 is shown in FIGS. 6A to 6D as comprising a rectangular sheet without any sidewalls. However, the second portion 224 of roller guide 220 may have a trapezoidal shape with the shorter of the two parallel sides being attached to the first portion 222 of roller guide 220. Moreover, the second portion 224 of roller guide 220 may have sidewalls. The sidewalls may assist in guiding the movement of radome cover shell 112 from the completely opened position to the closed position.

REFERENCE LIST 100 aircraft
102 aircraft airframe, fuselage
103 aircraft structure
104 aircraft door
104a, 104b, 104c, 104d cabin access doors
104e cargo deck access door
109 aircraft skin
110 nose region
112 radome cover shell
115 equipment
200 radome cover opening kinematic
210 guiding rail
215 curved end
217 guiding rail rear stopper
220 roller guide
222 first portion
224 second portion
230 plurality of rollers
230a, 230b, 230c roller
240 radome cover attachment surface
242 bore holes
250 roller bearing bracket
260 radome cover shell rotation stopper
300 latch, lock
305 latch and/or lock portion
310 eye
320 latch hook 330 biasing device
340 alignment fork
350 release push button
360 unlatch handle
370 release hook
380 opening handle
410 rod
412 first end
415 second end
420 rod holder bracket
430 rod retainer bracket
840 alignment pin.

What is claimed is:

1. An aircraft with an aircraft structure, comprising:
a radome cover shell that is adapted to enclose equipment in a nose region of the aircraft in a closed position; and
a radome cover opening kinematic that enables a first movement of the radome cover shell from the closed position to an opened position and a second movement of the radome cover shell from the opened position to the closed position, wherein the radome cover opening kinematic comprises:
a guiding rail that is attached to the radome cover shell, and
at least three rollers that are attached to the aircraft structure, wherein a first and a second roller of the at least three rollers are arranged on opposing sides of the guiding rail, and wherein the second and a third roller of the at least three rollers are arranged on the same side of the guiding rail, wherein the first movement of the radome cover shell from the closed position to the opened position comprises a longitudinal movement from the closed position to a first partially opened position, a first rotational movement from the first partially opened position to a second partially opened position, and a second rotational movement from the second partially opened position to the opened position, wherein the radome shell opening kinematic further comprises:
a radome cover shell rotation stopper that stops the second rotational movement of the radome cover shell at the opened position.

2. The aircraft of claim 1, further comprising:
a radome cover attachment surface that is attached to the radome cover opening kinematic and receives the radome cover shell.

3. The aircraft of claim 1, further comprising:
a roller bearing bracket that is attached to the aircraft structure and receives the at least three rollers.

4. The aircraft of claim 1, further comprising:
a plurality of latches that are adapted to maintain the radome cover shell in the closed position.

5. The aircraft of claim 4, wherein a latch of the plurality of latches further comprises:
an eye that is attached to the radome cover shell;
a latch hook that engages with the eye in the closed position; and
a biasing device that biases the latch hook to stay engaged with the eye.

6. The aircraft of claim 5, wherein the latch of the plurality of latches further comprises:
an alignment pin; and
an alignment fork, wherein the alignment pin and the alignment fork guide the eye towards the latch hook during at least a portion of the second movement of the radome cover shell from the opened position to the closed position.

7. The aircraft of claim 1, wherein the guiding rail further comprises:
a curved end that engages with the first roller to form a guiding rail rear stopper that stops the longitudinal movement of the radome cover shell at the first partially opened position.

8. The aircraft of claim 7, wherein the first roller defines a rotation axis around which the radome cover shell rotates during the first and second rotational movements of the radome cover shell.

9. The aircraft of claim 7, further comprising:
a roller guide that is attached to the radome cover shell, wherein at least the third roller of the at least three rollers is arranged between the guiding rail and the roller guide when the radome cover shell is in the closed position.

10. The aircraft of claim 9, wherein the roller guide further comprises:
a first portion that is parallel to the guiding rail; and
a second portion that is kinked away from the guiding rail at a predetermined angle.

11. The aircraft of claim 10, wherein the third roller is in contact with the second portion of the roller guide during the first rotational movement of the radome cover shell.

12. The aircraft of claim 10, wherein the roller guide is removed from the third roller during the second rotational movement of the radome cover shell.

13. The aircraft of claim 1, further comprising:
a rod having a first and a second end, wherein the first end is attached to the aircraft structure; and
a rod holder bracket that is mounted on the radome cover shell and adapted to receive the second end of the rod when the radome cover shell is in the opened position.

14. The aircraft of claim 13, further comprising:
a rod retainer bracket that is mounted on the aircraft structure and adapted to receive the second end of the rod when the radome cover shell is in the closed position.

15. An aircraft with an aircraft structure, the aircraft comprising:
a radome cover shell movable between a closed position and an opened position, the radome cover shell capable of enclosing equipment in a nose region of the aircraft in the closed position; and
a radome cover opening kinematic that enables movement of the radome cover shell between the closed position and the opened position, wherein the radome cover opening kinematic comprises:
a guiding rail attached to the radome cover shell, and
at least three rollers attached to the aircraft structure, a first roller of the at least three rollers arranged on a first side of the guiding rail, and a second roller and a third roller of the at least three rollers arranged on a second side of the guiding rail, wherein the radome shell opening kinematic further comprises:
a radome cover shell rotation stopper capable of stopping movement of the radome cover shell at the opened position;
further comprises a plurality of latches that are adapted to maintain the radome cover shell in the closed position; and
wherein movement of the radome cover shell from the closed position to the opened position comprises a first movement from the closed position to a first partially opened position, a second movement from the first partially opened position to a second partially opened position, and a third movement from the second partially opened position to the opened position such that the opened position comprises the opened position.

16. The aircraft of claim 15, further comprising:
a radome cover attachment surface attached to the radome cover opening kinematic capable of receiving the radome cover shell.

17. The aircraft of claim 15, further comprising:
a roller bearing bracket attached to the aircraft structure and receiving the at least three rollers.

18. An aircraft comprising:
an aircraft structure having a nose region;
a radome cover shell adapted to be able to enclose equipment in the nose region of the aircraft in a closed position; and
a radome cover opening kinematic that enables a first movement of the radome cover shell from the closed position to an opened position and a second movement of the radome cover shell from the opened position to the closed position, wherein the radome cover opening kinematic comprises:
a guide attached to the radome cover shell, and
at least three rollers attached to the aircraft structure, wherein a first roller and a second roller of the at least three rollers are arranged on opposing sides of the guide, and wherein the second roller and a third roller of the at least three rollers are arranged on the same side of the guide, wherein the first movement of the radome cover shell from the closed position to the opened position comprises a longitudinal movement from the closed position to a first partially opened position, a first rotational movement from the first partially opened position to a second partially opened position, and a second rotational movement from the second partially opened position to the opened position, wherein the radome shell opening kinematic further comprises:
a radome cover shell rotation stopper that stops the second rotational movement of the radome cover shell at the opened position.

19. The aircraft of claim 18, further comprising:
a plurality of latches that are adapted to maintain the radome cover shell in the closed position.

* * * * *